Patented Jan. 9, 1940

2,186,691

UNITED STATES PATENT OFFICE 2,186,691

PROTECTIVE COATING FOR FRUITS

Thomas R. Belzer, Los Angeles, Calif., assignor to Socony-Vacuum Oil Company, Incorporated, New York, N. Y., a corporation of New York No Drawing. Application December 10, 1938, Serial No. 245,037

2 Claims. (Cl. 99—168)

It is known in the art that fruits and the like may be protected against rapid spoiling by the application of a protective wax coating. However, although such coatings have proved themselves of great value, they cannot reach their highest effectiveness through purely mechanical protection of the fruit surface. This is because fungi and bacteria, which exist on the fruit prior to application of the wax and which cannot be completely removed by washing processes and the like, are free to grow and multiply beneath the protective coating. Also, since such wax coatings are somewhat permeable, as they must be in order to permit the natural respiration of the fruit, it is probable that some spores find their way through to the fruit after the wax has been applied.

I have discovered that the growth of destructive organisms can be controlled by adding to the waxing preparation the substance N—N¹ dichloro-azodicarbonamidine, represented by the graphic formula:

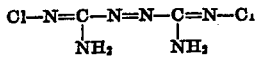

Although this substance is an effective bactericide and fungicide, it is non-toxic, relatively non-irritating, and odorless, and so cannot be considered an objectionable component of a protective coating for fruits. It is not colorless, but being yellow, it does not impair the external appearance of fruits, and I have found that it is free from any tendency to stain the actual fruit tissues. The substance is fat-soluble and therefore able to form an intimate mixture with the wax, and the fact that it is water-soluble as well is also advantageous in some respects.

A suitable waxing preparation for combination with the above named substance is the emulsion produced by the following formula:

| | Per cent by weight |
|---|---|
| Scale wax (melting point 122–124° F.) | 21 |
| "Daxad #23" (Dewey and Almy Corp.) | 1 |
| "Emulphor '0'" (Gen. Dyestuff Corp.) | 5 |
| Carnauba wax (#3 refined) | 3 |
| Water | 70 |

This emulsion is exemplary only, and I do not wish to limit myself to the particular formula, as there are many wax emulsions which may be substituted. Such a preparation, in combination with a desired proportion of the said N—N' dichloro-azodicarbonamidine, is applied evenly to the cleaned surface of the fruit and dried under suitable conditions of temperature, as is known in the art. Substantially all of the water evaporates, leaving a thin, slightly permeable, germicidal coating comprising a wax and the above named substance. In most cases emulsifying agents and the like will be contained as minor impurities in the protective coating, but without impairing the effectiveness.

The desired proportion of the above-named substance depends on a number of variable factors, and it is not practical to establish a fixed rule to fit all cases. I have found that as little as 0.1% in the emulsion has definitely beneficial effect in inhibiting the growth of bacteria and fungi, and that it is possible, though seldom if ever necessary, to use as much as 10% without impairing other desirable qualities of the wax coating.

Different fruits require different degrees of germicial effectiveness in the coating, oranges, for example, requiring less than apples. The condition of the fruit at the time of treatment may influence the choice of a proportion, as may also the sort of storage and handling to which the fruit is to be subjected. The amount of the above named substance to be used in a particular case is ascertainable by experiment, the proper proportion being the minimum which will dependably give the desired protection. A greater proportion would be undesirable because of cost of material and because of public aversion to unnecessarily large amounts of chemical preservatives, even when well within the limits of physiological propriety.

I claim as my invention:

1. A protective coating for fruits and the like, comprising a suitable wax and N—N' dichloro-azodicarbonamidine.

2. A material for protectively treating the surfaces of fruits and the like, comprising a suitable wax emulsion and N—N' dichloro-azodicarbonamidine.

THOMAS R. BELZER.